(12) United States Patent
Svetoslavov et al.

(10) Patent No.: US 7,827,566 B2
(45) Date of Patent: Nov. 2, 2010

(54) GRAPHICAL USER INTERFACE FOR MONITORING CLASSLOADING REFERENCES

(75) Inventors: Grigor Svetoslavov, Sofia (BG); Vencislav Dimitrov, Permik (BG); Nikolai Dimitrov, Sofia (BG)

(73) Assignee: SAP AG, Walldorf (DE)

( * ) Notice: Subject to any disclaimer, the term of this patent is extended or adjusted under 35 U.S.C. 154(b) by 1575 days.

(21) Appl. No.: 10/856,242

(22) Filed: May 28, 2004

(65) Prior Publication Data

US 2005/0267962 A1 Dec. 1, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ............... 719/331; 719/332; 717/166; 715/713

(58) Field of Classification Search ............... 715/853, 715/854, 855, 738, 345; 345/738; 717/166; 719/331, 332
See application file for complete search history.

(56) References Cited

U.S. PATENT DOCUMENTS

| | | | | |
|---|---|---|---|---|
| 5,632,022 A * | 5/1997 | Warren et al. | ............... | 715/776 |
| 5,745,109 A * | 4/1998 | Nakano et al. | ............... | 715/838 |
| 6,240,549 B1 * | 5/2001 | Hamada et al. | ............. | 717/130 |
| 6,748,396 B2 * | 6/2004 | Klicnik et al. | ............ | 707/103 Y |
| 6,985,909 B2 * | 1/2006 | Blohm | ................ | 707/102 |
| 7,039,923 B2 * | 5/2006 | Kumar et al. | ............... | 719/331 |
| 7,398,522 B2 * | 7/2008 | Komatsu et al. | ............. | 717/151 |
| 7,536,412 B2 * | 5/2009 | Blohm | .............................. | 1/1 |
| 7,603,666 B2 * | 10/2009 | McPherson et al. | .......... | 717/166 |
| 7,614,045 B2 * | 11/2009 | Kuck et al. | ................... | 717/166 |
| 7,644,403 B2 * | 1/2010 | Atsatt | ......................... | 717/166 |
| 7,665,080 B2 * | 2/2010 | Spotwood | .................... | 717/166 |
| 7,665,087 B1 * | 2/2010 | Bosschaert et al. | ............. | 718/1 |
| 2003/0163481 A1 * | 8/2003 | Blohm | ........................ | 707/102 |
| 2004/0255293 A1 * | 12/2004 | Spotswood | .................. | 717/176 |
| 2004/0255294 A1 * | 12/2004 | Spotwood | .................... | 717/176 |

OTHER PUBLICATIONS

Musan et al."Ontolgy Acquistion from On-line Knowledge Sources"; May 2000, Stanford Medical Informatics, Stanford University, Stanford, CA.*

NPL Reference U: Kozen et al. "Eager Class Initialization for Java." Copyright 2002.*

NPL Reference V: Liang et al. "Dynamic Class Loading in the Java Virtual Machine." Copyright 1998.*

(Continued)

*Primary Examiner*—Doug Hutton
*Assistant Examiner*—Soumya Dasgupta
(74) *Attorney, Agent, or Firm*—Schwegman, Lundberg & Woessner, P.A.

(57) ABSTRACT

A method, apparatus, and system are provided for a Graphical User Interface (GUI) for monitoring classloading references. In an embodiment, the GUI includes a graphical representation of one or more resources of an application server. The one or more resources may be selectable via, for example, a cursor control device. In an embodiment, a graphical representation of a selected class loader and one or more associated classloading references are displayed in the GUI, responsive to receiving a selection input specifying one of the displayed resources.

26 Claims, 9 Drawing Sheets

OTHER PUBLICATIONS

NPL Reference W: Oracle White Paper. "Classloading in Oracle9iAS Containers for J2EE." Copyright Jan. 2003.*

Paal et al. "Java Classs Separation for Multi-Application Hosting." Copyright 2002.*

Liang et al. "Dynamic Class Loading in the Java Virtual Machine." Copyright 1998.*

Factor et al. "Instrumentation of Standard Libraries in Object-Oreinted Languages: the Twin Hierarchy Approach". Copyright Oct. 28, 2004.*

Kozen et al. "Eager Class INitialization for Java". Copyright 2002.*

"Classloading in Oracle9iAS Containers for J2EE—An Oracle White Paper". Copyright Jan. 2003.*

* cited by examiner

GRAPHICAL USER INTERFACE FOR MONITORING CLASSLOADING REFERENCES

TECHNICAL FIELD

Embodiments of the invention generally relate to the field of system resource monitoring and more particularly, to a graphical user interface for monitoring classloading references.

BACKGROUND

Figure 1:
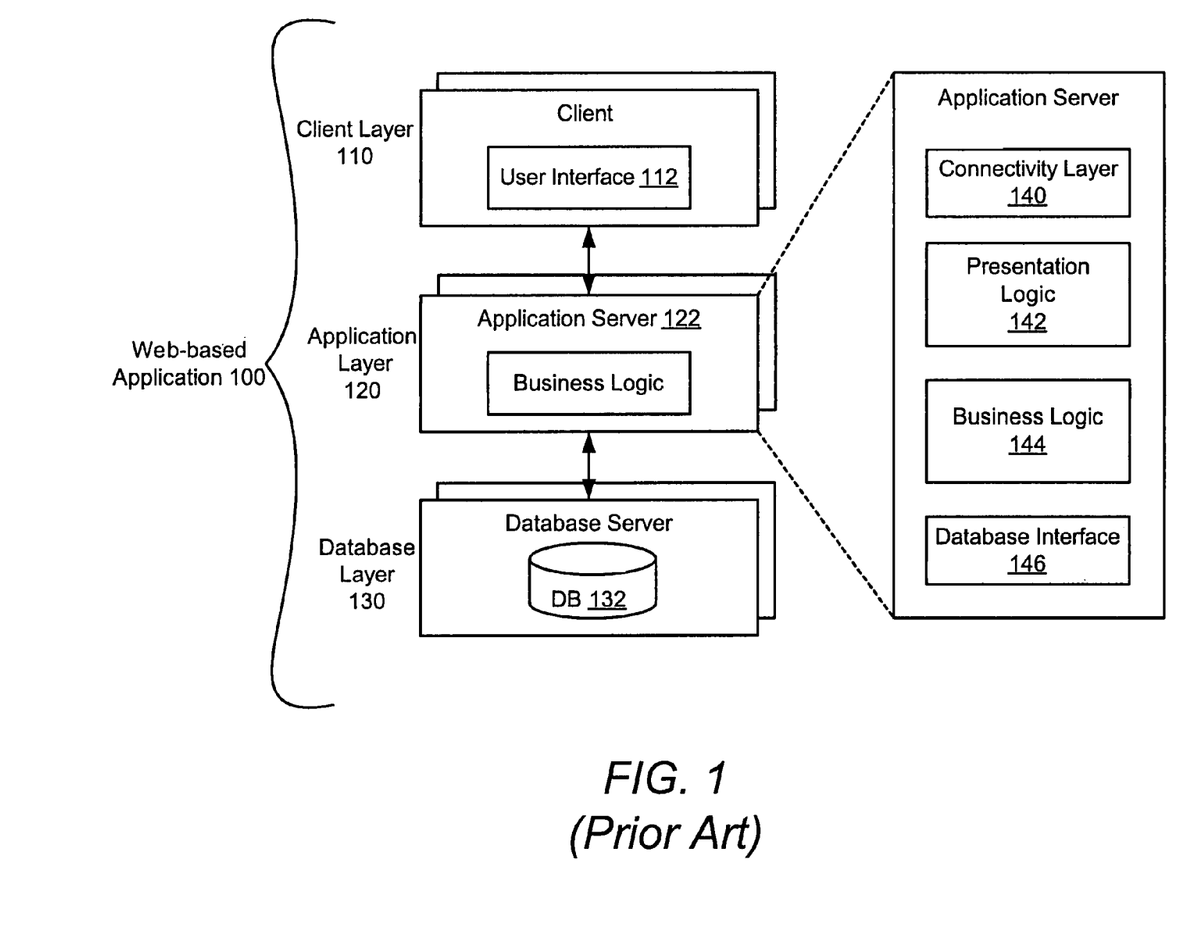
FIG. 1 is a block diagram of a Web-based application having a multi-tiered architecture.

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the HyperText Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

The popularity of the J2EE Standard is based, in part, on the hardware independent nature of the Java platform. Unlike programs written in C or C++, Java programs are not compiled into machine language for a specific hardware platform. Instead, they are compiled into an intermediate language called bytecode. The bytecode includes a binary representation of data types such as classes and interfaces. The term "class" refers to a data type that defines a collection of objects that share the same characteristics.

The executable portions of a class file are machine code for a special kind of computer called a Java Virtual Machine (JVM). The JVM is a software implementation of an execution engine for the class files. The JVM provides classes to programs as needed during runtime. The term "class loading" refers to the process of bringing a binary representation of a class into the JVM.

One or more class loaders control the loading of classes into the JVM. A "class loader" is an implementation of a class that is responsible for finding and loading class files at runtime. Class loaders are organized into parent/child hierarchies in which each "child" class loader maintains a reference to its "parent" class loader. Typically, a class loader is able to delegate the loading of a class to another class loader. For example, when a child class loader is presented with a class loading request, it checks whether its parent class loader can load the class before trying to load the class itself.

Although the multi-tiered architecture provides a more flexible and scalable architecture than traditional two-tier systems, it also results in significant added complexity. Application servers based on the J2EE Standard use a variety of class loaders to, for example, load J2EE components. In addition, a separate class loader may be used to load the classes for each application deployed to the application server. These class loaders may use a relatively complex set of references to delegate the loading of classes to one another.

SUMMARY OF THE INVENTION

A method, apparatus, and system are provided for a Graphical User Interface (GUI) for monitoring classloading references. In an embodiment, the GUI includes a graphical representation of one or more resources of an application server. The one or more resources may be selectable via, for example, a cursor control device. In an embodiment, a graphical representation of a selected class loader and one or more associated classloading references are displayed in the GUI, responsive to receiving a selection input specifying one of the displayed resources.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method, apparatus, and system are provided for a Graphical User Interface (GUI) for monitoring classloading references. In an embodiment, the GUI includes a graphical representation of one or more resources of an application server. The one or more resources may be selectable via, for example, a cursor control device. In an embodiment, a graphical representation of a selected class loader and one or more associated classloading references are displayed in the GUI, responsive to receiving a selection input specifying one of the displayed resources.

Figure 2:
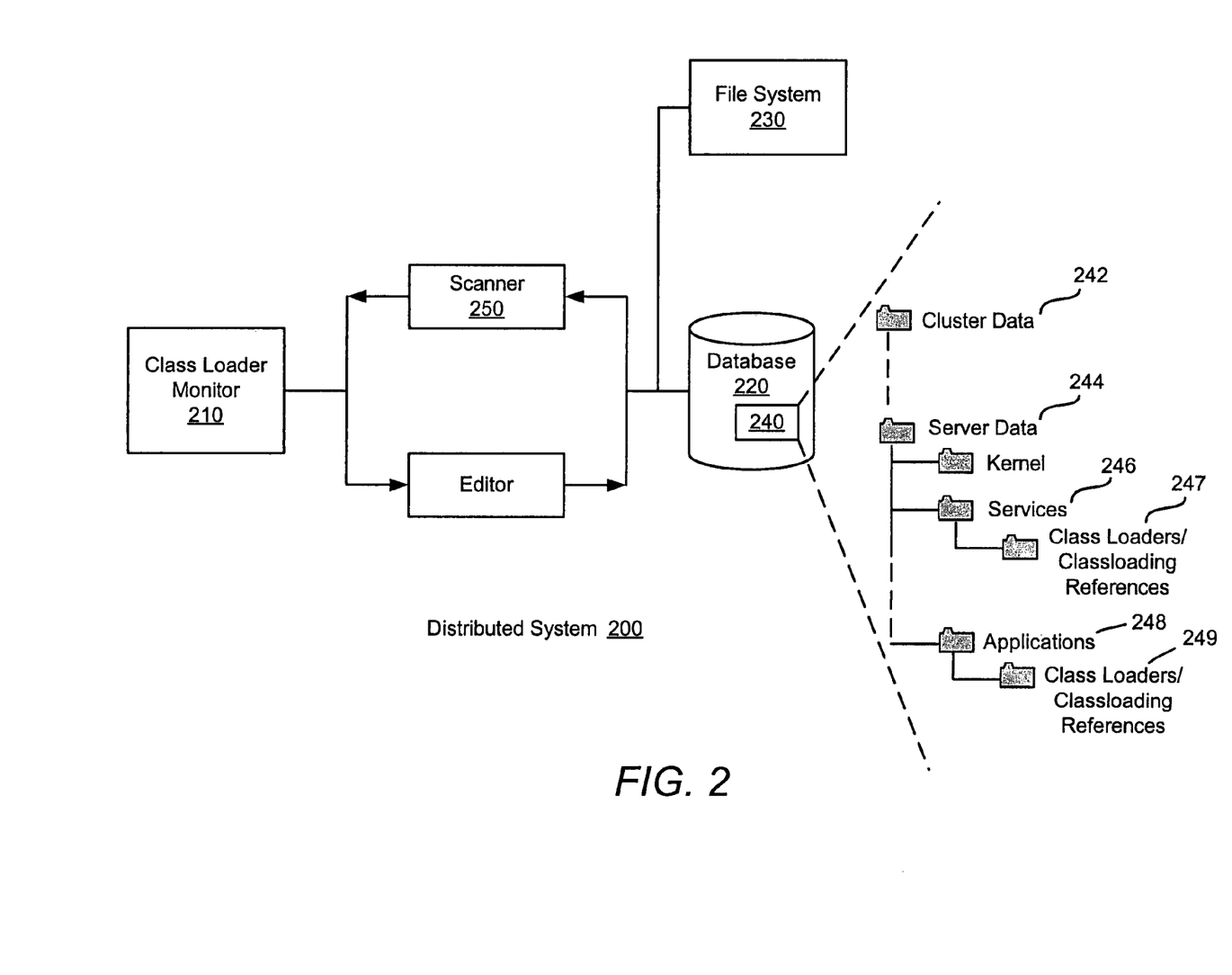
FIG. 2 is a block diagram of a distributed system implemented to provide an offline and online graphical user interface for monitoring classloading references according to an embodiment of the invention.

FIG. 2 is a block diagram of distributed system 200 implemented to provide an offline and online graphical user interface for monitoring classloading references according to an embodiment of the invention. In the illustrated embodiment, distributed system 200 includes class loader monitor 210, database 220, and file system 230. In an alternative embodiment, distributed system 200 may include more elements, fewer elements, and/or different elements.

Database 220 is a persistent store for data and programs. In an embodiment, database 220 includes a Database Management System (DBMS) to control the persistently stored data including the overall organization of the data, retrieval of the data, and integrity of the data. In one embodiment, database 220 stores configuration data 240 to define one or more communicatively coupled application servers.

In an embodiment, configuration data 240 provides configuration data for a "cluster" of application servers. An application server cluster (or simply, cluster) broadly refers to a group of communicatively coupled application servers. The cluster may include one or more application server "instances," a central database (e.g., database 220) and central services. In an embodiment, an application server "instance" includes a group of redundant application servers and a dispatcher (cluster elements). The dispatcher distributes server requests to each of the redundant application servers based on the load of each of the servers. The instances may communicate with each other via a messaging service of the central services. Generally, the cluster elements share a central database. In an embodiment, the cluster may be centrally defined and configured in the central database. In an alternative embodiment, configuration data 240 may merely provide configuration data for a single application server.

In the illustrated embodiment, configuration data 240 includes cluster data 242 and server data 244. Cluster data 242 may include, for example, configuration data that is associated with all servers (e.g., dispatchers and application servers) within the cluster. Server data 244 provides configuration data for a particular server. In an embodiment, server data 244 includes services data 246 and applications data 248. The term "service" refers to functionality derived from a particular software program. In one embodiment, an application server may include the services defined by the J2EE Standard and proprietary services defined by the application server vendor. In an embodiment, services data 246 provides the configuration data for the services available to an application server.

In an embodiment, one or more class loaders load the classes that make up the services defined in services data 246. Typically, each of these class loaders attempts to delegate the loading of classes to a number of other class loaders before loading the class itself. Also, any given class loader may have a load operation passed to it by one or more class loaders. The term "classloading references" refers to the various delegation relationships between class loaders. The classloading references may be initially, defined by, for example, a developer and then, in some cases, the references may be modified after the application server is installed. Classloading references data 247 illustrates data that defines classloading references for one or more services.

One or more applications may be deployed to an application server. The deployed applications may provide the business logic (e.g., business logic 144, shown in FIG. 1) in an enterprise network. Applications data 248 illustrates the configuration data for the applications deployed to an application server. In one embodiment, the application data 248 may be for example, Enterprise Application Archive files (EARs) or Java archive files (JARs). In one embodiment, each application deployed to an application server has a separate class loader. Classloading references data 249 illustrates data that defines classloading references for one or more services.

In an embodiment, class loader monitor 210 provides graphical information about class loaders, class loading hierarchies, and classloading references. As is further described below, class loader monitor 210 may provide both offline and online monitoring of the class loading system of an application server or a cluster of application servers. The term "offline" refers to, for example, monitoring a class loading system when an application server is not running. In one embodiment, class loader monitor 210 provides a central management system for class loaders. Centralized management of class loaders and their associated classloading references is especially important for J2EE application servers because these servers use a large number of class loaders each potentially having a number of classloading references.

In an embodiment, class loader monitor 210 obtains class loader data and classloading references data (e.g., class loader/classloading references data 247 and 249) from database 220. For example, scanner 250 may scan configuration data 240 to obtain class loader/classloading references data 247 and 249. Scanner 250 may be a manager or other software entity capable of searching for and retrieving data from database 220.

In one embodiment, class loader monitor 210 may parse the data obtained from database 220. For example, a Strongly Connected Components (SCC) algorithm may be used to find the cyclic relationships defined in class loader/classloading references data 247, 249. Alternatively, class loader monitor 210 may use different algorithm(s) and/or additional algorithms to parse class loader/classloading references data 247, 249.

In an embodiment, class loader monitor 210 provides a graphical user interface (GUI) to monitor the obtained data. The GUI may display a selected class loader and the relationships between the selected class loader and other class loaders (e.g., classloading references) within an application server (or selected cluster node). The GUI provided by class loader monitor 210 (and its runtime representative) are further discussed below with reference to FIGS. 3-7.

Figure 3:
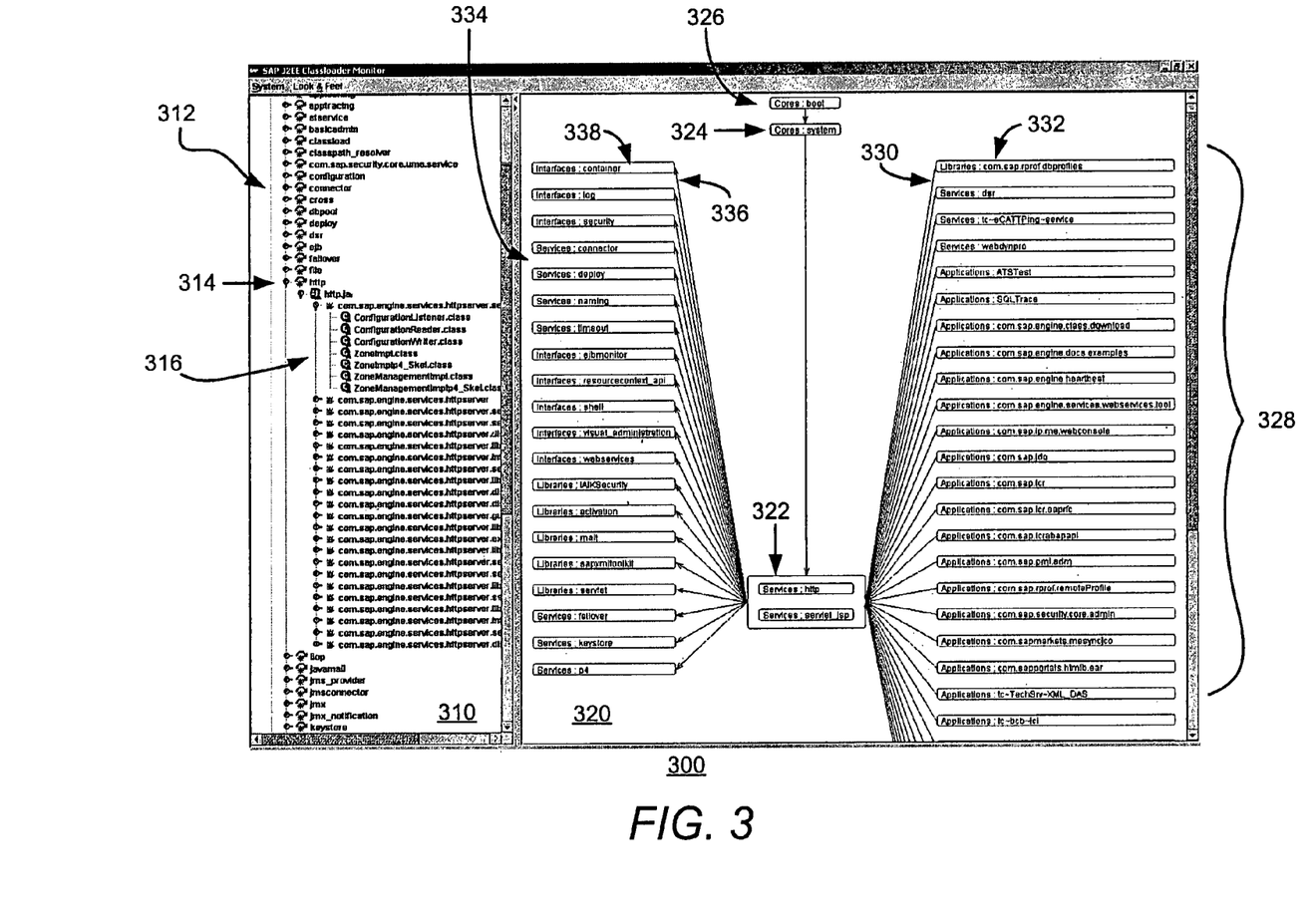
FIG. 3 illustrates a Graphical User Interface (GUI) provided by a class loader monitor, according to an embodiment of the invention.

FIG. 3 illustrates a Graphical User Interface (GUI) 300 provided by a class loader monitor, according to an embodiment of the invention. The illustrated embodiment of GUI 300 includes panels 310 and 320. The term "window" refers to a scrollable viewing area on a screen. The term "panel" broadly refers to a sub-section of a window if, for example, the window is divided into two or more regions. Typically panels and windows are rectangular in shape but they are not required to be rectangular.

In the illustrated embodiment, panel 310 displays hierarchical tree structure 312 having one or more tree nodes. Hierarchical tree structure 312 may be based on the data obtained from a database (e.g., database 220, shown in FIG. 2). In one embodiment, each of the one or more tree nodes represents a resource within an application server. In the illustrated embodiment, the displayed portion of hierarchical tree structure 312 has a number of tree nodes representing services provided by an application server. For example, HTTP node 314 represents the HyperText Transfer Protocol (HTTP) service provided by an application server.

In an embodiment, each tree node may have a number of depending tree nodes. Each of the depending tree nodes may represent a component or sub-part of the resource represented by the "parent" tree node. For example, in the illustrated embodiment, HTTP node 314 has, for example, depending tree nodes 316 representing additional info for the HTTP service.

In an embodiment, a cursor control device (e.g., a pointing device and/or a keyboard) may be used to select one or more of the tree nodes displayed in panel 310. In the illustrated embodiment, for example, HTTP node 314 is selected. In such an embodiment, panel 320 may display information about a portion of the class loading system associated with the selected tree node. For example, class loader 322 represents the class loader for the HTTP service. For ease of discussion, the displayed class loader that represents the selected resource is referred to as the selected class loader.

In an embodiment, classloading references are permitted to be circular. That is, even if class loader A delegates (or refers) to class loader B, class loader B may also be allowed to refer to class loader A. In such cases, panel 320 may display a single class loader to represent one or more components that refer to each other. The term "common class loader" refers to a class loader that represents two or more class loaders having circular references. In the illustrated embodiment, class loader 322 is a common class loader representing, for example, a class loader for the HTTP service and a class loader for a Java Server Page (JSP) servlet.

As described above, a class loader delegates the loading of classes (or, for ease of discussion, may refer) to its parent class loader. Class loader 324 represents the parent class loader of common class loader 322. In an embodiment, the complete "ancestry" of a class loader may be displayed. For example, boot class loader 326 represents the primogenitor class loader of common class loader 322.

In an embodiment, the conventional delegate-to-parent delegation model is extended. In other words, common class loader 322 first attempts to delegate a load operation to parent class loader 324. If parent class loader 324 is unable to load the class, common class loader 322 may then attempt to load the class through any number of referenced class loaders. The classloading references may be defined by, for example, a developer and/or an administrator. Classloading references 328 illustrate the delegation references defined for common class loader 322.

In an embodiment, each classloading reference 328 includes a reference type indicator (e.g., reference type indicator 330) and a representation of a class loader (e.g., class loader 332). In an embodiment, each of the class loaders represented by classloading references 328 may become the selected class loader by selecting it with, for example, a cursor control device. For example, class loader 332 may take the place of common class loader 322, if it is selected via a cursor control device. Reference type indicator 330 provides a mechanism for illustrating the degree to which one class loader may depend on another class loader. In one embodiment, there are four types of references: parent, notify, hard, and soft. The parent type reference is described above.

In an embodiment, the hard and soft reference types may determine, for example, the "start-up" order of the class loaders. For example, in one embodiment, a hard reference type indicates that the referenced class loader is to be automatically loaded when the referring class loader is loaded. The soft reference type may indicate that the referenced class loader need not be automatically loaded when the referenced class loader is loaded. The notify reference type may indicate that the referenced class loader (and/or its associated service or application) is to be notified when the referring class loader is loaded. In an alternative embodiment, more reference types, fewer reference types, and/or different reference types may be used.

In an embodiment, the color of reference type indicator 330 indicates the reference type. For example, if reference type indicator 330 is green, then the reference type is soft. Similarly, the color brown may indicate a hard reference type and the color blue may indicate a parent reference type. In an alternative embodiment, a different scheme may be used to distinguish one reference type from another. For example, a selection of line weights, line patterns, symbols, etc. may be used to distinguish one reference type from another.

In one embodiment, panel 320 displays a graphical representation of one or more class loaders that delegate (or refer) to common class loader 322. These class loaders may be referred to as "referencing" class loaders since they refer to the selected class loader (e.g., common class loader 322). Classloading references 334 illustrate a number of class loaders (e.g., referencing class loaders) referring to selected class loader 332. In an embodiment, each classloading reference 334 includes a reference type indicator (e.g., reference type indicator 336) and a representation of a class loader (e.g., class loader 338). In an embodiment, each of the class loaders represented by classloading references 334 may become the selected class loader by selecting it with, for example, a cursor control device.

In an embodiment, class loaders may be organized into the following groups: interfaces, libraries, services, and applications. The name of each displayed class loader may include the name of its parent group (e.g., service: HTTP). In one embodiment, there is a separate class loader for each application deployed to an application server.

Figure 4:
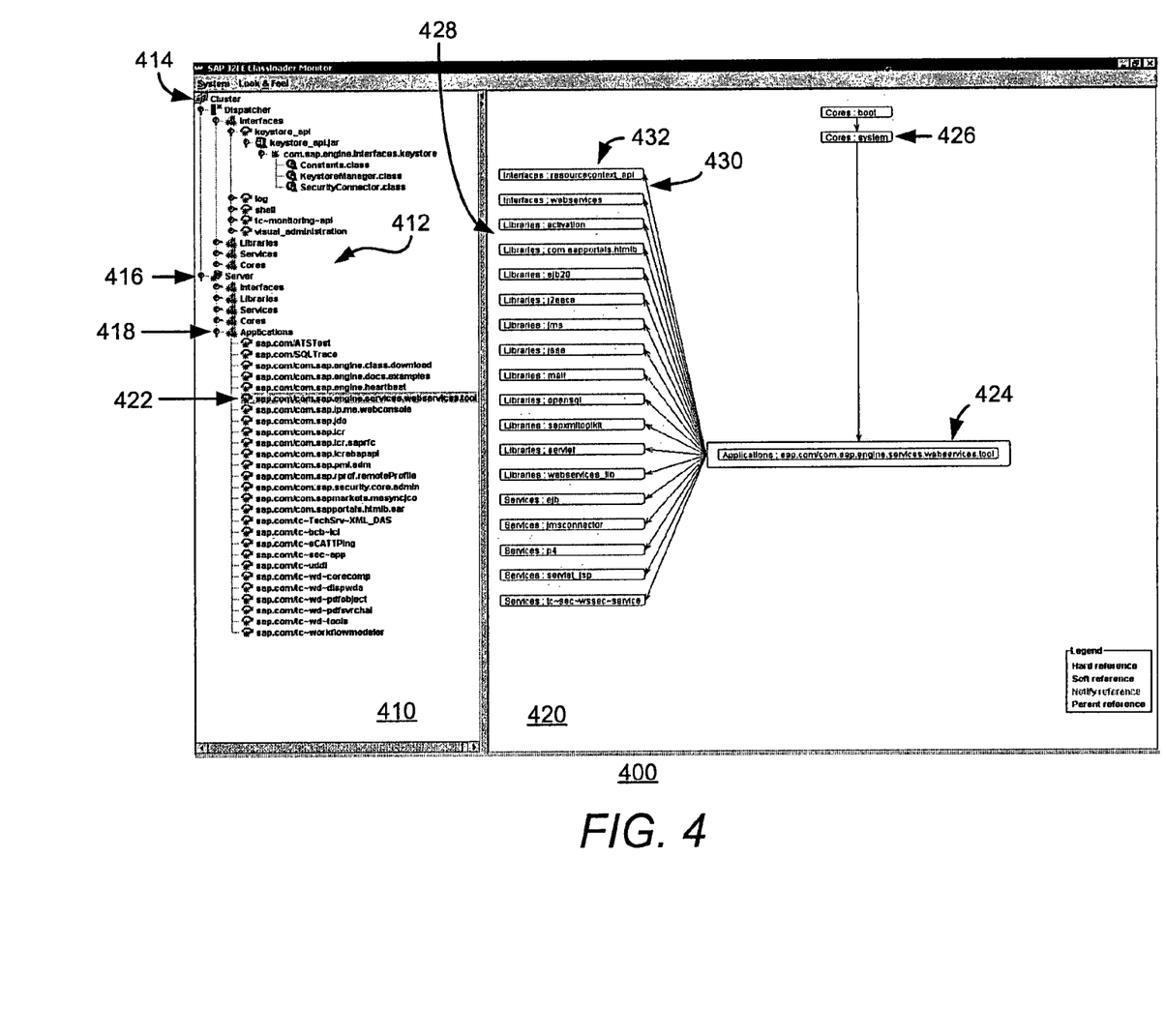
FIG. 4 illustrates a GUI to monitor application class loaders, according to an embodiment of the invention.

FIG. 4 illustrates a Graphical User Interface (GUI) 400 to monitor application class loaders, according to an embodiment of the invention. The illustrated embodiment of GUI 400 includes panels 410 and 420. In the illustrated embodiment, panel 410 displays hierarchical tree structure 412 having one or more tree nodes. In an embodiment in which an application server is part of a cluster of application servers, each of the one or more tree nodes represents a resource within the cluster of application servers. For example, in the illustrated embodiment, cluster node 414 is a tree node that represents the entire cluster of application servers. Similarly, server node 416 represents an application server within the cluster.

In the illustrated embodiment, applications node 418 contains data about one or more applications deployed to the server represented by server node 416. In one embodiment, each application deployed to the server is represented by a depending tree node. For example, Web services node 422 represents a Web services tool deployed to the server.

In an embodiment, a cursor control device may be used to select one of the application tree nodes depending from applications node 418. In the illustrated embodiment, for example, Web services tool node 422 is selected (e.g., as shown by the highlighting). In such an embodiment, panel 420 may display class loading system data associated with the selected application. For example, class loader 424 is a graphical illustration of the selected application's class loader. For ease of discussion, the displayed class loader that represents the selected resource is hereinafter referred to as the selected class loader.

In an embodiment, panel 420 displays classloading references for selected class loader 424. For example, class loader 426 is the parent class loader for selected class loader 424. In an embodiment, classloading references 428 represent a number of referencing class loaders. That is, classloading references 428 represent a number of class loaders that delegate (or refer) to selected class loader 424. In an embodiment, each classloading reference 428 includes a reference type indicator (e.g., reference type indicator 430) and a representation of a class loader (e.g., class loader 432). In an embodiment, each of the class loaders represented by classloading references 428 may become the selected class loader by selecting it with, for example, a cursor control device.

As described above with reference to FIG. 2, a class loader monitor may obtain configuration data that describes an application server (or a cluster of application servers) from a database (e.g., database 220, shown in FIG. 2). The obtained data may include class loader data (e.g., which class loader loads a given class) and classloading references data (e.g., to which class loader(s) does a given class loader delegate load operations). Collectively this data may be referred to as "class loader resource data."

In an embodiment, applications that are deployed to a server have a number of components (e.g., Web components, Enterprise Java Bean components, etc.) that are packaged together in an Enterprise Application Archive (EAR) file. The EAR file also typically includes a number of deployment descriptors that describe how the components interrelate both with each other and with the environment in which they will be deployed. In one embodiment, the class loader resource data for a given application may be obtained from one or more of the deployments descriptors for the application.

Figure 5:
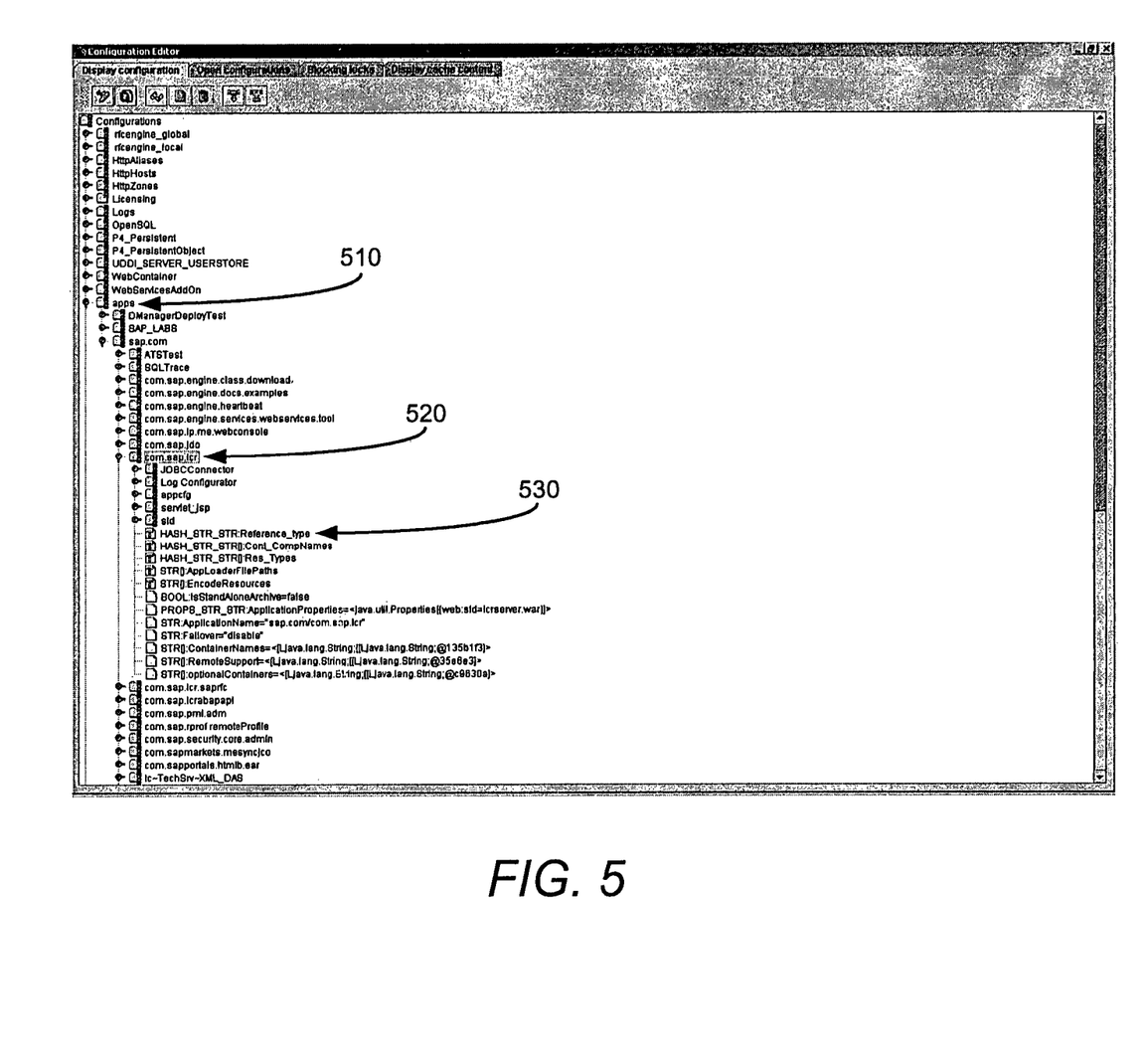
FIG. 5 illustrates a logical view of selected elements of configuration data for an application server, according to an embodiment of the invention.

FIG. 5 illustrates a logical view of selected elements of configuration data for an application server, according to an embodiment of the invention. In the illustrated embodiment, the configuration data may include application data 510. Application data 510 may include, for example, one or more EAR files (e.g., EAR file 520). EAR file 520 includes deployment descriptor 530 to describe the relationships between the components of EAR file 520. In one embodiment, a class loader monitor may obtain class loader resource data from, for example, deployment descriptor 530 and provide that data in a graphical user interface (e.g., GUI 400).

An application server may provide a number of interfaces, services, etc. that may, collectively, be called application server components. The application server components may be specified, at least in part, by a standard (e.g., the J2EE Standard) or they may be proprietary. These application server components may be defined in configuration data that is stored on a database (e.g., database 220, shown in FIG. 2). For example, in one embodiment, the application server components are described in a number of mark-up language files called provider Extensible Markup Language (XML) files. In one embodiment, the class loader monitor obtains class loader resource data for a given application server component from the provider XML files for the component.

Figure 6:
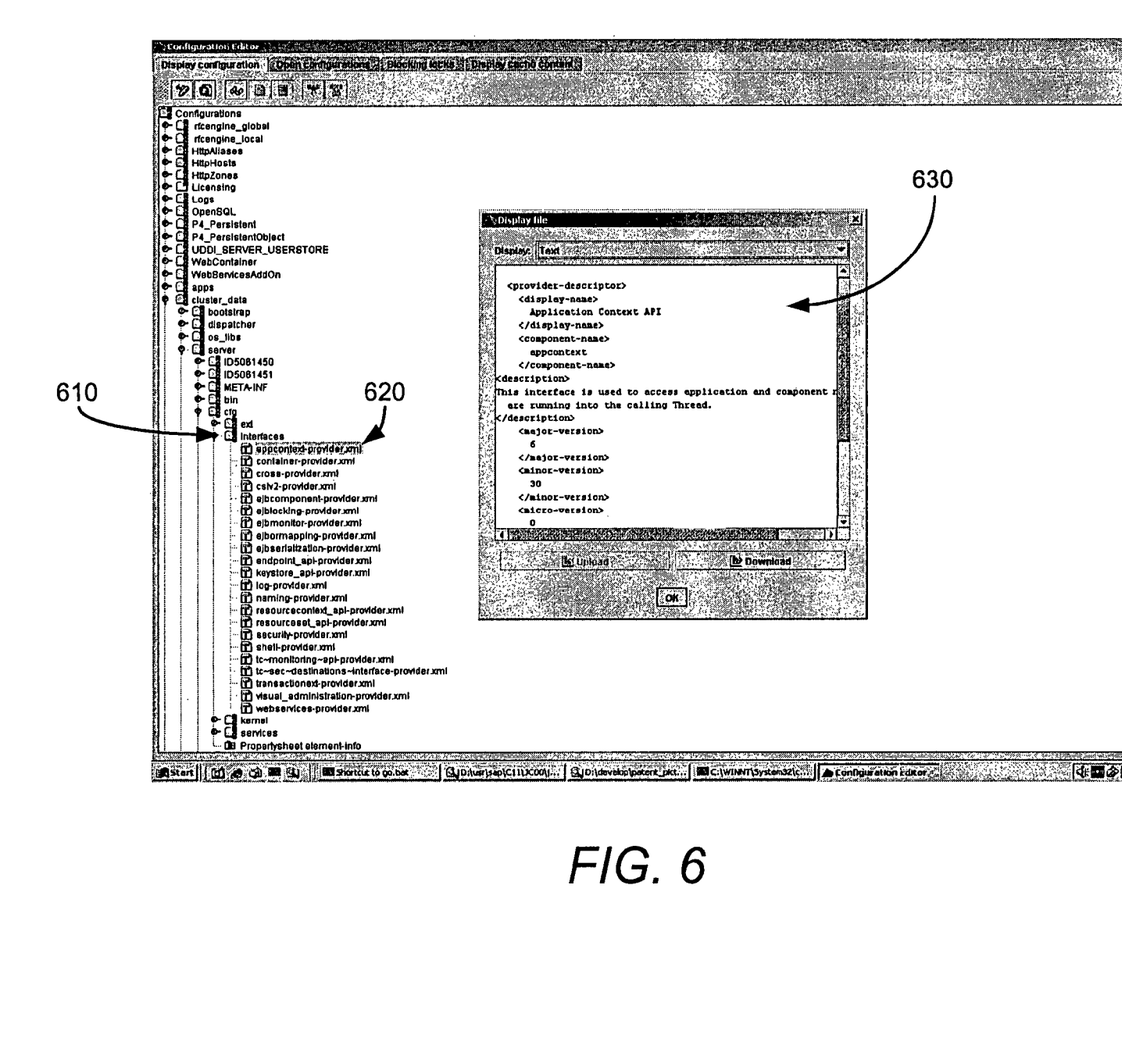
FIG. 6 illustrates a logical view of selected elements of configuration data for an application server, according to an embodiment of the invention.

FIG. 6 illustrates a logical view of selected elements of configuration data for an application server, according to an embodiment of the invention. In the illustrated embodiment, the configuration data includes application server component data 610. Application server component data 610 includes a number of provider XML files to describe the component (e.g., provider XML file 620). In one embodiment, a class loader monitor may obtain class loader resource data from, for example, provider XML file 620 and provide that data in a graphical user interface (e.g., GUI 400).

In one embodiment, a file editor having write access to the database may be used to modify a file containing class loader resource data. For example, in the illustrated embodiment, editor 630 displays the contents of provider XML 620. An end-user may alter the data displayed in editor 630 and upload it to the database.

Figure 7:
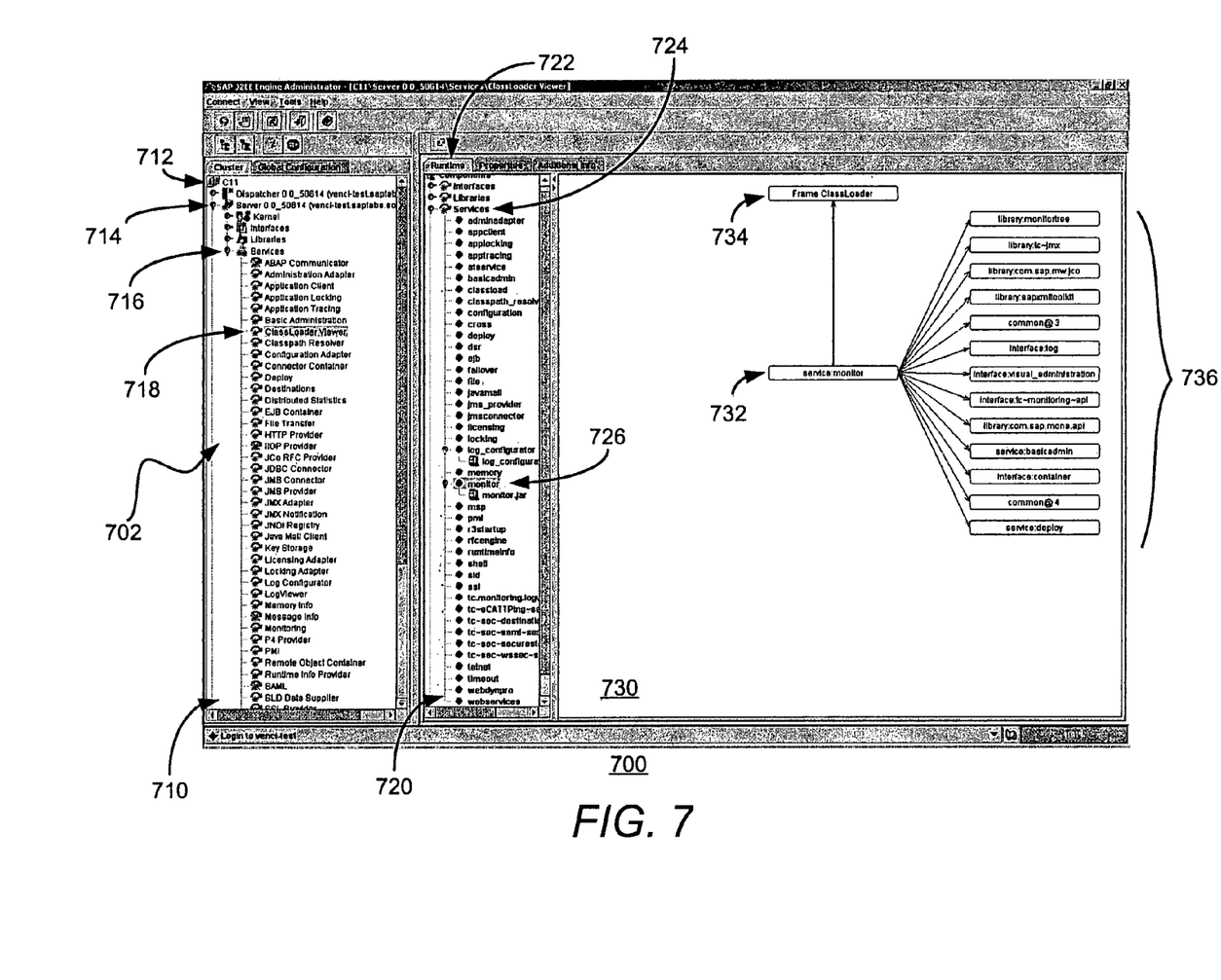
FIG. 7 illustrates a GUI to monitor class loaders during runtime, according to an embodiment of the invention.

FIG. 7 illustrates a Graphical User Interface (GUI) 700 to monitor class loaders during runtime, according to an embodiment of the invention. GUI 700 may be provided, at least in part, by a service running an application server called a class loader viewer service. In one embodiment, the class loader viewer service provides runtime control for monitoring classloading references of an application server (or a cluster node).

The illustrated embodiment of GUI 700 includes panels 710, 720, and 730. In the illustrated embodiment, panel 710 displays hierarchical tree structure 702 having one or more tree nodes. In an embodiment in which an application server is part of a cluster of application servers, each of the one or more tree nodes represents a resource within the cluster of application servers. For example, in the illustrated embodiment, cluster node 712 is a tree node that represents the entire cluster of application servers. Similarly, server node 714 is a server node that represents an application server within the cluster.

Services node 716 represents the services provided by a cluster node. In one embodiment, each node depending from services node 716 represents a particular service. For example, class loader viewer node 718 represents the class loader viewer service. In an embodiment, runtime class loading system data for server 714 may be viewed by selecting class loader viewer service 718.

In an embodiment, runtime tab 722 provides access to panels 720 and 730. Panel 720 may display a hierarchical tree structure of a number of components registered on server node 714. In one embodiment, the class loaders are organized into the following groups: interfaces, libraries, services, and applications. For example, services node 724 represents the class loaders for the services of server node 714. In one embodiment, the class loaders displayed in panel 720 are selectable via, for example, a cursor control device. In response to selecting one of the displayed class loaders, a graphical representation of the selected class loader and its classloading references is displayed in panel 730.

For example, in the illustrated embodiment, monitor class loader 726 is selected in panel 720. Class loader 732, shown in panel 730, is a graphical representation of monitor class loader 726. Panel 730 also displays a number of classloading references associated with class loader 732. For example, class loader 732 references parent class loader 734 as well as referenced class loaders 736. In one embodiment, referenced class loaders 736 are displayed in the order in which they were configured into the configuration data stored on a database. In an embodiment, any of the referenced class loaders may become the "selected" class loader (e.g., displayed in the middle and surrounded by its associated references) by being selected with a cursor control device.

Figure 8:
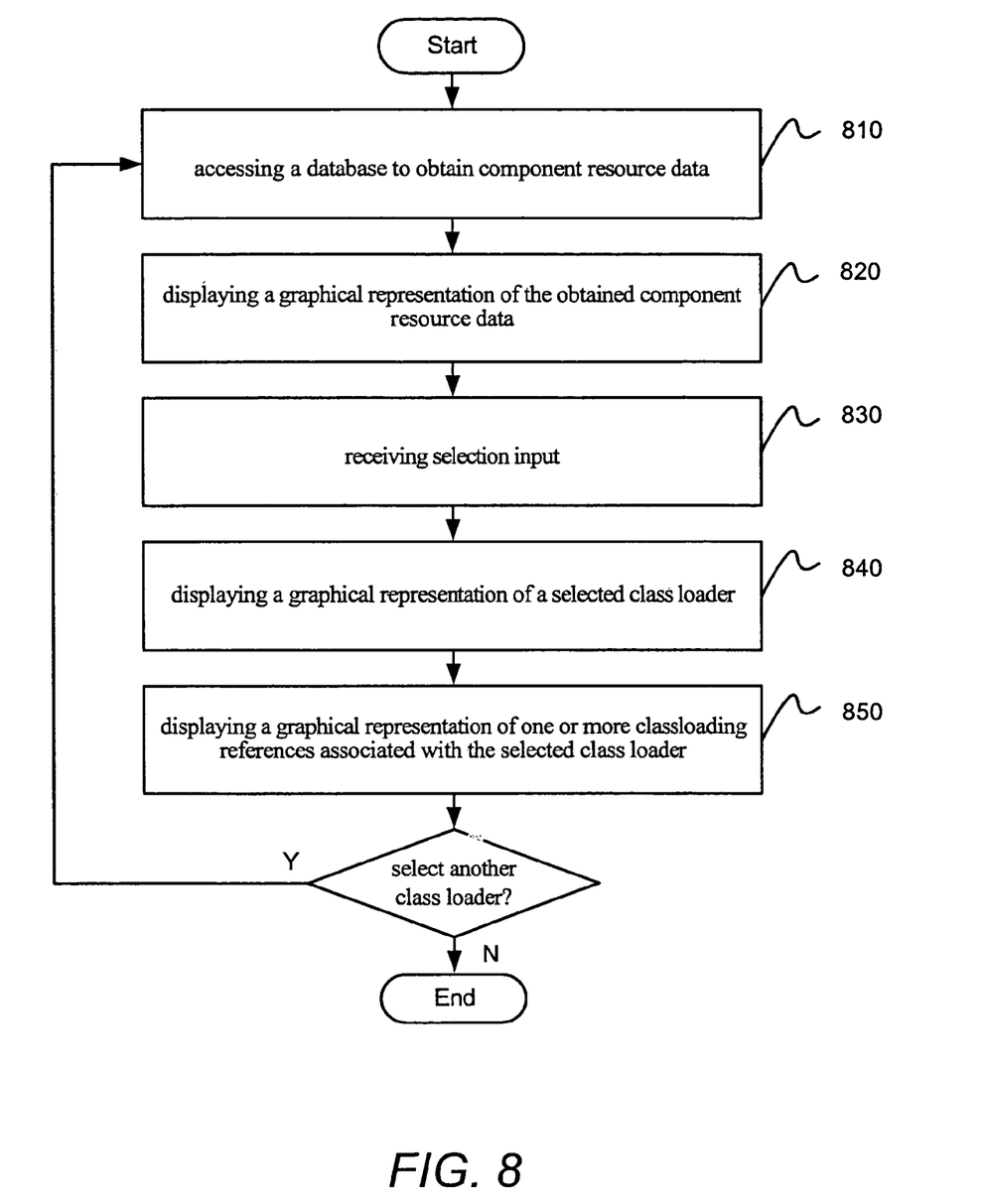
FIG. 8 is a flow diagram illustrating certain aspects of a method for monitoring classloading references, according to an embodiment of the invention.

Turning now to FIG. 8, the particular methods associated with embodiments of the invention are described in terms of computer software and hardware with reference to a flowchart. The methods to be performed by a visual administrator for specifying service references to support a service may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for monitoring classloading references, according to an embodiment of the invention. Referring to process block 810 component resource data is accessed from a database. In one embodiment, an application server (or a cluster of application servers) is defined by configuration data stored on a database. The configuration data may include data indicating which class loader(s) is to load a given resource. In addition, the configuration data may indicate to which class loader(s), if any, a given class loader is to delegate a load operation. In an embodiment, the term class loader resource data refers to the class loader data and the classloading references data. The data may be obtained by, for example, scanning the database (e.g., with scanner 250, shown in FIG. 2).

Referring to process block 820, a graphical representation of the obtained component resource data is displayed in a Graphical User Interface (GUI). In an embodiment, the GUI displays, for example, a hierarchical tree structure of an application server's resources such as services and/or deployed applications. In addition, the GUI may display one or more class loaders and associated classloading references.

Referring to process block 830, a class loader monitor receives selection input from, for example, an end-user who is monitoring a class loading system. The received selection input may be an indication from a cursor control device, keyboard, touch-screen display, voice activated peripheral, etc. In an embodiment, the selection input may specify a displayed resource (e.g., HTTP service 314, shown in FIG. 3) or a displayed class loader (e.g., displayed class loader 332, shown in FIG. 3).

Referring to process block 840, a graphical representation of a selected class loader is displayed (e.g., common class loader 322). In war embodiment, the selected class loader may be a class loader that loads classes for a resource selected in process block 830. Alternatively, the selected class loader may be a class loader that is initially displayed as a referenced class loader and is then selected via, for example, a cursor control device to become the selected class loader.

Referring to process block 850, a graphical representation of one or more classloading references that are associated with the selected class loader are displayed in the GUI. Examples of classloading references may include: a reference to a parent class loader; a reference to a class loader to which the selected class loader is to delegate a load; and/or a reference from a class loader that is to delegate a load to the selected class loader (e.g., a referencing class loader). In one embodiment, each classloading reference includes a reference type indicator and a class loader (e.g., either referenced or referencing).

Figure 9:
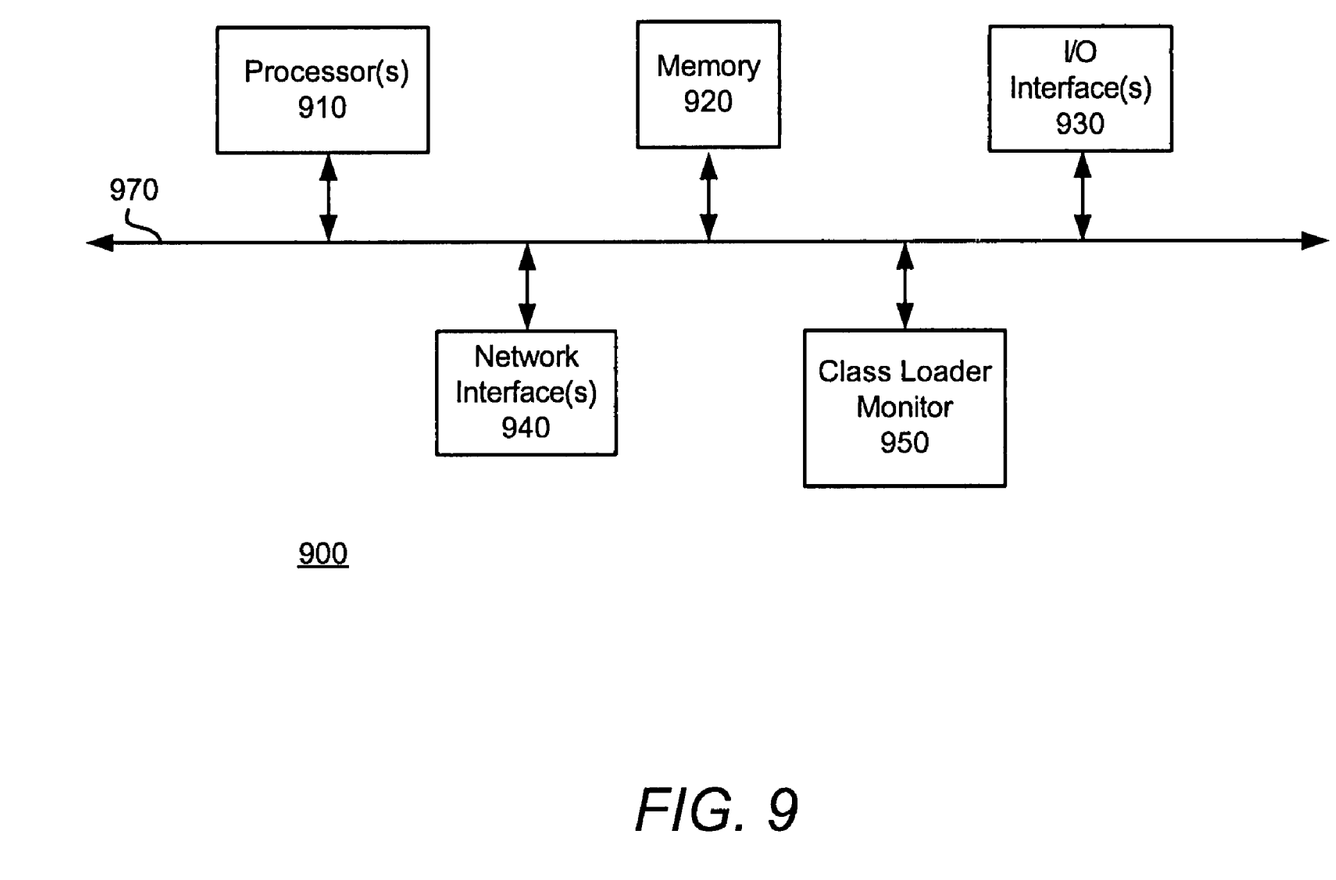
FIG. 9 is a block diagram of a computing device implemented according to an embodiment of the invention.

FIG. 9 is a block diagram of computing device 900 implemented according to an embodiment of the invention. Computing device 900 may include: processor(s) 910, memory 920, one or more Input/Output interfaces 930, network interface(s) 940, and class loader monitor 950. The illustrated elements may be connected together through system interconnection 970. Processor(s) 910 may include a microprocessor, microcontroller, field programmable gate array (FPGA), application specific integrated circuit (ASIC), central processing unit (CPU), programmable logic device (PLD), and similar devices that access instructions from system storage (e.g., memory 920), decode them, and execute those instructions by performing arithmetic and logical operations.

Class loader monitor 950 enables computing device 900 to provide a GUI for monitoring a class loading system. Class loader monitor 950 may be executable content, control logic (e.g., ASIC, PLD, FPGA, etc.), firmware, or some combination thereof, in an embodiment of the invention. In embodiments of the invention in which class loader monitor 950 is executable content, it may be stored in memory 920 and executed by processor(s) 910.

Memory 920 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 920 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 920 may store program modules such as routines, programs, objects, images, data structures, program data, and other program modules that perform particular tasks or implement particular abstract data types that facilitate system use.

One or more I/O interfaces 930 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 970 permits communication between the various elements of computing device 900. System interconnection 970 may include a wide variety of signal lines including one or more of a memory bus, peripheral bus, local bus, host bus, bridge, optical, electrical, acoustical, and other propagated signal lines.

Elements of embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method employed within a network, the method comprising:
   accessing a database to obtain class loader resource data of an application server;
   displaying an interactive graphical representation of the obtained class loader resource data;
   receiving selection input specifying at least a portion of the displayed class loader resource data; and
   displaying an interactive graphical representation of a selected class loader and one or more classloading references associated with the selected class loader, responsive to receiving the selection input,
   wherein the selected class loader is displayed as a single component to represent two or more class loaders referring to each other, and
   wherein the interactive graphical representation of the selected classloader and associated class loading references indicates delegation references currently defined for the selected class loader,
   the selected class loader being a common class loader representing two or more class loaders having circular references, being class loaders that refer to each other, wherein the common class loader is displayed as the single component.

2. The method of claim 1, wherein displaying the interactive graphical representation of one or more classloading references comprises displaying at least one of:
   a referenced parent class loader,
   a referenced class loader to which the selected class loader is to delegate a loading of a class, and
   a referencing class loader to delegate a loading of a class to the selected class loader.

3. The method of claim 1, wherein displaying the interactive graphical representation of one or more classloading references comprises:
   displaying the interactive graphical representation of one or more classloading references while the application server is offline.

4. The method of claim 1, wherein displaying the interactive graphical representation of one or more classloading references comprises:
   displaying the interactive graphical representation of one or more classloading references in an order based, at least in part, on a sequence in which class loaders are to be loaded on the application server.

5. The method of claim 1, wherein each displayed class loader reference includes a reference type indicator to indicate a reference type for the displayed class loader.

6. The method of claim 5, wherein the reference type indicator indicates that the reference type is one of:
   a hard reference,
   a soft reference,
   a notify reference, and
   a parent reference.

7. The method of 1, further comprising:
   receiving selection input specifying one of the one or more displayed classloading references; and
   displaying a class loader associated with the specified class loader reference as a new selected class loader.

8. The method of claim 1, wherein displaying the interactive graphical representation of the obtained class loader resource data comprises:
   displaying a hierarchical tree structure representing one or more resources of the application server.

9. An apparatus comprising:
   a display screen to display a Graphical User Interface (GUI); and
   a processor and logic executable thereon to provide the GUI, the GUI including
      an interactive graphical representation of one or more resources of an application server and corresponding classloaders, the one or more resources and the corresponding classloaders selectable via a cursor control device; and
      upon receiving selection input specifying one of the resources and one of the corresponding classloaders, an interactive graphical representation of a selected class loader and one or more associated classloading references,
      wherein the selected class loader is displayed as a single component to represent two or more class loaders referring to each other, and
      wherein the interactive graphical representation of the selected classloader and associated classloading references indicates delegation references currently defined for the selected classloader,
      the selected class loader being a common class loader representing two or more class loaders having circular references, being class loaders that refer to each other, wherein the common class loader is displayed as the single component.

10. The apparatus of claim 9, wherein
    the interactive graphical representation of one or more resources of the application server is displayed in a first panel of the GUI, and
    the interactive graphical representation of the selected class loader and one or more associated class loading references are displayed in a second panel of the GUI.

11. The apparatus of claim 10, wherein the one or more associated classloading references includes at least one of:
    a referenced parent class loader;
    a referenced class loader to which the selected class loader is to delegate a loading of a class; and
    a referencing class loader to delegate a loading of a class to the selected class loader.

12. A system comprising:
    means for accessing a database to obtain class loader resource data of an application server;
    means for displaying an interactive graphical representation of the obtained class loader resource data;
    means for receiving selection input specifying at least a portion of the displayed class loader resource data; and
    means for displaying an interactive graphical representation of a selected class loader and one or more classloading references associated with the selected class loader, responsive to receiving the selection input, wherein the selected class loader is displayed as a single component to represent two or more class loaders referring to each other, and wherein the interactive graphical representation of the selected classloader and associated class loading references indicates delegation references currently defined for the selected class loader, the selected class loader being a common class loader representing two or more class loaders having circular references, being class loaders that refer to each other, wherein the common class loader is displayed as the single component.

13. The system of claim 12, wherein the means for displaying the interactive graphical representation of one or more classloading references comprises:

means for displaying the interactive graphical representation of one or more classloading references while the application server is offline.

14. A display device displaying a Graphical User Interface (GUI) to monitor a class loading system, the GUI comprising:

an interactive graphical representation of one or more resources of an application server and corresponding classloaders, the one or more resources and the corresponding classloaders selectable via a cursor control device operable with the display device, the interactive graphical representation generated by a computing device that includes one or more processors, and the interactive graphical representation including a display of a selected class loader and one or more associated classloading references, wherein the selected class loader is displayed as a single component to represent two or more class loaders referring to each other, and wherein the graphical representation of the selected classloader and the associated classloading references indicates delegation references currently defined for the selected classloader, the selected class loader being a common class loader representing two or more class loaders having circular references, being class loaders that refer to each other, wherein the common class loader is displayed as the single component.

15. The display device displaying a GUI of claim 14, wherein the interactive graphical representation of one or more resources of the application server is displayed in a first panel of the GUI, and the interactive graphical representation of the selected class loader and one or more associated class loading references are displayed in a second panel of the GUI.

16. The display device displaying a GUI of claim 15, wherein the selected class loader is displayed in a central region of the second panel.

17. The display device displaying a GUI of claim 15, wherein the one or more associated classloading references includes at least one of:

a referenced parent class loader;

a referenced class loader to which the selected class loader is to delegate a loading of a class; and a referencing class loader to delegate a loading of a class to the selected class loader.

18. The display device displaying a GUI of claim 17, wherein the referenced class loader is displayed in a first region of the second panel.

19. The display device displaying a GUI of claim 18, wherein the referencing class loader is displayed in a second region of the second panel, and further wherein the first region and the second region are on opposing sides of the selected class loader.

20. The display device displaying a GUI of claim 17, wherein each of the one or more associated classloading references is selectable via a cursor control device.

21. The display device displaying a GUI of claim 20, wherein upon receiving selection input specifying one of the one or more associated classloading references, the specified class loader reference is to be displayed in an approximate center of the second panel as a new selected class loader.

22. The display device displaying a GUI of claim 14, wherein each of the displayed classloading references includes a reference type indicator to specify a type of reference.

23. The display device displaying a GUI of claim 22, wherein the reference type indicator is one of:

a hard reference indicator, a soft reference indicator, a notify reference indicator, and a parent reference indicator.

24. An article of manufacture comprising:

an electronically accessible storage medium providing instructions that, when executed by an apparatus, cause the apparatus to perform operations including access a database to obtain class loader resource data of an application server;

display an interactive graphical representation of the obtained class loader resource data;

receive selection input specifying at least a portion of the displayed class loader resource data; and display an interactive graphical representation of a selected class loader and one or more classloading references associated with the selected class loader, responsive to receiving the selection input, wherein the selected class loader is displayed as a single component to represent two or more class loaders referring to each other, and wherein the interactive graphical representation of the selected classloader and associated class loading references indicates delegation references currently defined for the selected class loader, the selected class loader being a common class loader representing two or more class loaders having circular references, being class loaders that refer to each other, wherein the common class loader is displayed as the single component.

25. The article of manufacture of claim 24, wherein each displayed class loader reference includes a reference type indicator to indicate a reference type for the displayed class loader.

26. The article of manufacture of claim 25, wherein the reference type indicator indicates that the reference type is one of:

a hard reference, a soft reference, a notify reference, and a parent reference.

* * * * *